United States Patent
Jafarian et al.

(10) Patent No.: US 9,414,252 B2
(45) Date of Patent: Aug. 9, 2016

(54) TRAFFIC INDICATION MAP INFORMATION ELEMENT INDICATOR FOR TIM SEGMENTATION

(71) Applicant: QUALCOMM Incorporated, San Diego, CA (US)

(72) Inventors: Amin Jafarian, San Diego, CA (US); Alfred Asterjadhi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 20 days.

(21) Appl. No.: 14/486,801

(22) Filed: Sep. 15, 2014

(65) Prior Publication Data
US 2015/0181452 A1  Jun. 25, 2015

Related U.S. Application Data

(60) Provisional application No. 61/919,690, filed on Dec. 20, 2013.

(51) Int. Cl.
| | |
|---|---|
| H04W 4/00 | (2009.01) |
| H04W 24/10 | (2009.01) |
| H04W 8/18 | (2009.01) |
| H04W 88/08 | (2009.01) |
| H04W 52/02 | (2009.01) |
| H04W 72/04 | (2009.01) |
| H04W 28/06 | (2009.01) |
| H04W 76/04 | (2009.01) |
| H04W 68/00 | (2009.01) |
| H04W 84/12 | (2009.01) |

(52) U.S. Cl.
CPC ............... *H04W 24/10* (2013.01); *H04W 8/18* (2013.01); *H04W 52/0216* (2013.01); *H04W 72/042* (2013.01); *H04W 88/08* (2013.01); *H04W 28/06* (2013.01); *H04W 68/00* (2013.01); *H04W 76/048* (2013.01); *H04W 84/12* (2013.01)

(58) Field of Classification Search
None
See application file for complete search history.

(56) References Cited

U.S. PATENT DOCUMENTS 9,220,032 B2 * 12/2015 Park ................. H04W 28/0263
2009/0016306 A1 * 1/2009 Wang ................ H04W 74/006
370/338

(Continued)

FOREIGN PATENT DOCUMENTS

KR    20140051034 A    4/2014

OTHER PUBLICATIONS

Ghosh C (Nokia): 11 CC9-clause-9-32j-comment-resolution ; 11-13-8819-03-00ah-cc9-clause-9-32j-comment-resolution, IEEE DRAFT; 11-13-0819-03-00AH-CC9-CLAUSE-9-32J-COMMENT-RESOLUTION, IEEE-SA MENTOR, Piscataway, NJ USA, vol. 802.11ah, No. 3, Aug. 21, 2013, pp. 1-7, XP068062756, [retrieved on Aug. 21, 2013] p. 2-p. 6.

(Continued)

*Primary Examiner* — Anh-Vu Ly
(74) *Attorney, Agent, or Firm* — Patterson & Sheridan, LLP

(57) ABSTRACT

Certain aspects of the present disclosure provide methods for generating traffic indication map (TIM) information elements (IE) for stations that support and stations that do not support TIM segmentation (page slicing). A method generally includes generating an IE, and providing an indication of whether or not the IE is for devices that support segmentation.

18 Claims, 9 Drawing Sheets

(56) References Cited

U.S. PATENT DOCUMENTS

| | | | |
|---|---|---|---|
| 2010/0189021 A1 | 7/2010 | He et al. | |
| 2014/0010152 A1* | 1/2014 | Park | H04W 28/065 370/328 |
| 2014/0313952 A1* | 10/2014 | Ghosh | H04L 1/00 370/311 |
| 2014/0334368 A1* | 11/2014 | Zhou | H04W 48/12 370/311 |
| 2015/0296532 A1* | 10/2015 | Zhou | H04W 72/1263 370/329 |

OTHER PUBLICATIONS

International Search Report and Written Opinion—PCT/US2014/067378—ISA/EPO—Feb. 24, 2015.

Park M, "TGah-SFD-D14.x ; 11-13-0599-00-00-ah-tgah-sfd-d14-x", IEEE SA MENTOR; 11-13-0599-00-00AH-TGAH-SFD-D14-X, IEEE-SA MENTOR, Piscataway, NJ USA, vol. 802.11ah, May 15, 2013, pp. 1-76, XP068054133, [retrieved on May 15, 2013] p. 21.

\* cited by examiner

TRAFFIC INDICATION MAP INFORMATION ELEMENT INDICATOR FOR TIM SEGMENTATION

CROSS-REFERENCE TO RELATED APPLICATIONS

This application claims benefit of U.S. Provisional Patent Application Ser. No. 61/919,690, entitled "Traffic Indication Map Information Element Indicator for TIM Segmentation," filed Dec. 20, 2013, and assigned to the assignee hereof, the contents of which are herein incorporated by reference.

BACKGROUND

1. Field of the Invention

Certain aspects of the present disclosure generally relate to wireless communications and, more particularly, to generating an information element (IE) that may be decoded by stations that support and stations that do not support segmentation.

2. Relevant Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the desire for greater coverage and increased communication range, various schemes are being developed. One such scheme is the sub-1-GHz frequency range (e.g., operating in the 902-928 MHz range in the United States) being developed by the Institute of Electrical and Electronics Engineers (IEEE) 802.11ah task force. This development is driven by the desire to utilize a frequency range that has greater wireless range than other IEEE 802.11 groups and has lower obstruction losses.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved communications between access points and stations in a wireless network.

Certain aspects of the present disclosure provide an apparatus for wireless communications. The apparatus generally includes a processing system configured to generate an information element (IE) and provide an indication of whether or not the IE is for devices that support segmentation.

Certain aspects of the present disclosure provide a method for wireless communications. The method may be performed, for example, by an access point (AP). The method generally includes generating an information element and providing an indication of whether or not the IE is for devices that support segmentation.

Certain aspects of the present disclosure provide an apparatus for wireless communications. The apparatus generally includes means for generating an information element and means for providing an indication of whether or not the IE is for devices that support segmentation.

Certain aspects of the present disclosure provide a computer program product for wireless communications. The computer program product generally includes a computer-readable medium having instructions stored thereon, the instructions executable by an apparatus for generating an information element and providing an indication of whether or not the IE is for stations that support segmentation.

Certain aspects of the present disclosure provide an apparatus for wireless communications. The apparatus generally includes a processing system configured to obtain an information element and determine whether or not the IE is for devices that support segmentation.

Certain aspects of the present disclosure provide a method for wireless communications. The method may be performed, for example, by a station (STA). The method generally includes obtaining an information element and determining whether or not the IE is for devices that support segmentation.

Certain aspects of the present disclosure provide an apparatus for wireless communications. The apparatus generally includes means for obtaining an information element and means for determining whether or not the IE is for devices that support segmentation.

Certain aspects of the present disclosure provide a computer program product for wireless communications. The computer program product generally includes a computer-readable medium having instructions stored thereon, the instructions executable by an apparatus for obtaining an information element and determining whether or not the IE is for devices that support segmentation.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
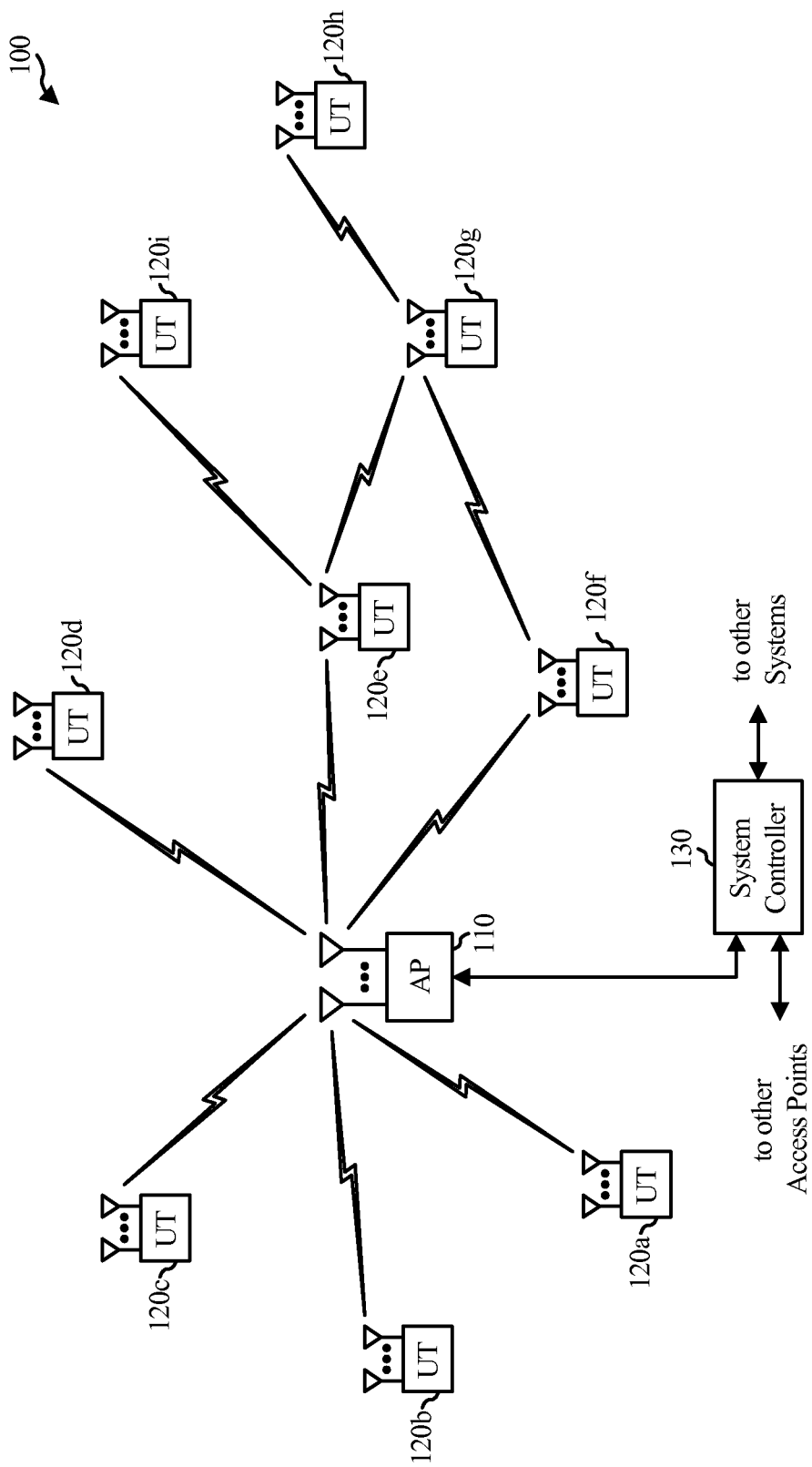
FIG. 1 illustrates a diagram of an example wireless communications network, in accordance with certain aspects of the present disclosure.

In systems where stations stay in low power states (e.g., in a sleep state) much of the time, an IE may be provided with TIM information to indicate which stations have traffic and thus should exit a low power state to receive that traffic. TIM information may be provided, for example, as a bitmap, with each bit indicating whether a corresponding station has traffic or not. As a large number of stations may be supported, the size of a bitmap may be large, and to reduce the overhead associated with transmitting a single large bitmap, the bitmap may be segmented (or sliced) into smaller bitmaps. Each segment or slice may have an associated segment number, which may contain usable information for stations that support segmentation (or slicing) but may not contain usable information for stations that do not support segmentation. Aspects of the present disclosure provide for generating IEs that indicate whether or not the IE is intended for stations that support or do not support segmentation, which may allow for the use of page segmentation for communication with devices that support and do not support segmentation.

Aspects of the present disclosure provide methods of generating an IE that indicates whether or not the IE is intended for stations that support segmentation.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an AP or an access terminal.

An AP may comprise, be implemented as, or known as a Node B, Radio Network Controller (RNC), evolved Node B (eNB), Base Station Controller (BSC), Base Transceiver Station (BTS), Base Station (BS), Transceiver Function (TF), Radio Router, Radio Transceiver, Basic Service Set (BSS), Extended Service Set (ESS), Radio Base Station (RBS), or some other terminology.

An access terminal (hereinafter "AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol (SIP) phone, a wireless local loop (WLL) station, a personal digital assistant (PDA), a handheld device having wireless connection capability, a STA, or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with APs and user terminals in which aspects of the present disclosure may be practiced. For simplicity, only one AP 110 is shown in FIG. 1. An AP is generally a fixed station that communicates with the user terminals and may also be referred to as a base station or some other terminology. A user terminal may be fixed or mobile and may also be referred to as a mobile station, a wireless device, or some other terminology. AP 110 may communicate with one or more user terminals 120 at any given moment on the downlink and uplink. The downlink (i.e., forward link) is the communication link from the AP to the user terminals, and the uplink (i.e., reverse link) is the communication link from the user terminals to the AP. A user terminal may also communicate peer-to-peer with another user terminal. A system controller 130 couples to and provides coordination and control for the APs.

Figure 8:
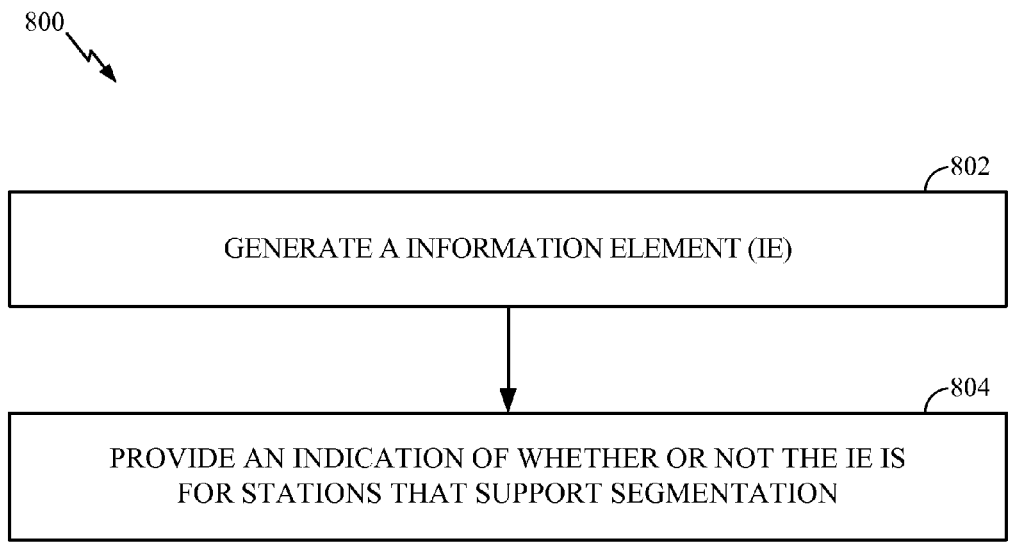
FIG. 8 illustrates example operations that may be performed by a wireless device in accordance with certain aspects of the present disclosure.

AP 110, for example, may be configured to perform or direct operations 800 in FIG. 8 to generate an IE and provide an indication of whether or not the IE is for devices that support page slicing and/or other processes for the techniques described herein. User terminals 120, for example, may be configured to perform or direct operations 900 in FIG. 9 to receive an IE and determine whether or not the IE is for devices that support page slicing and/or other processes for the techniques described herein.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The AP 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the AP. In general, each selected user terminal may be equipped with one or multiple antennas (i.e., $N_{ut} \geq 1$). The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
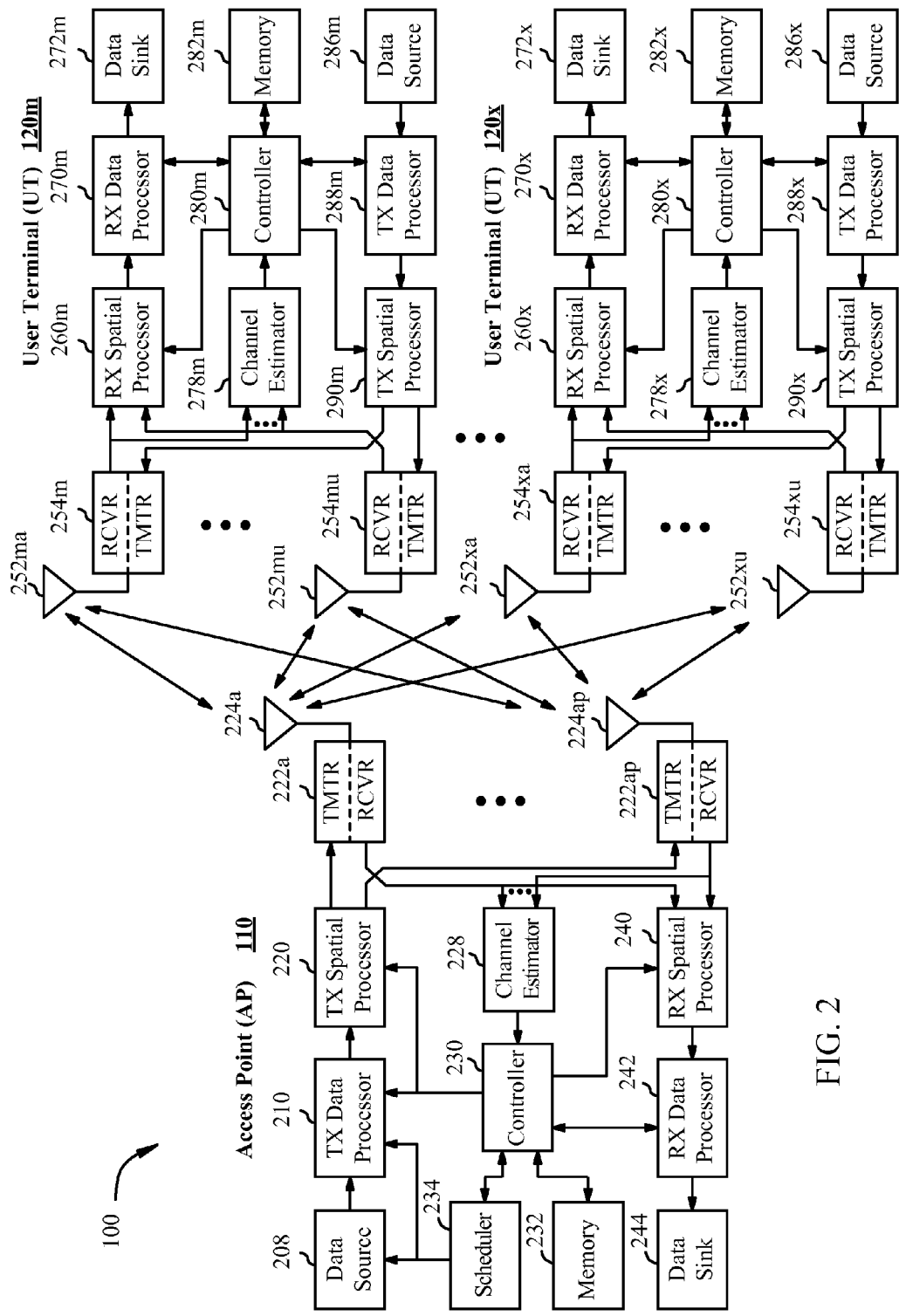
FIG. 2 illustrates a block diagram of an example access point and user terminals, in accordance with certain aspects of the present disclosure.

FIG. 2 illustrates a block diagram of AP 110 and two user terminals 120m and 120x in MIMO system 100. The AP 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The AP 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the AP and user terminal.

On the uplink, at each user terminal 120 selected for uplink transmission, a transmit (TX) data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the AP.

$N_{up}$ user terminals may be scheduled for simultaneous transmission on the uplink. Each of these user terminals performs spatial processing on its data symbol stream and transmits its set of transmit symbol streams on the uplink to the AP.

At AP 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at AP 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from AP 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the AP based on the effective uplink channel response matrix $H_{up,eff}$. Controller 280 for each user terminal may send feedback information (e.g., the downlink and/or uplink eigenvectors, eigenvalues, SNR estimates, and so on) to the AP. Controllers 230 and 280 also control the operation of various processing units at AP 110 and user terminal 120, respectively.

Figure 3:
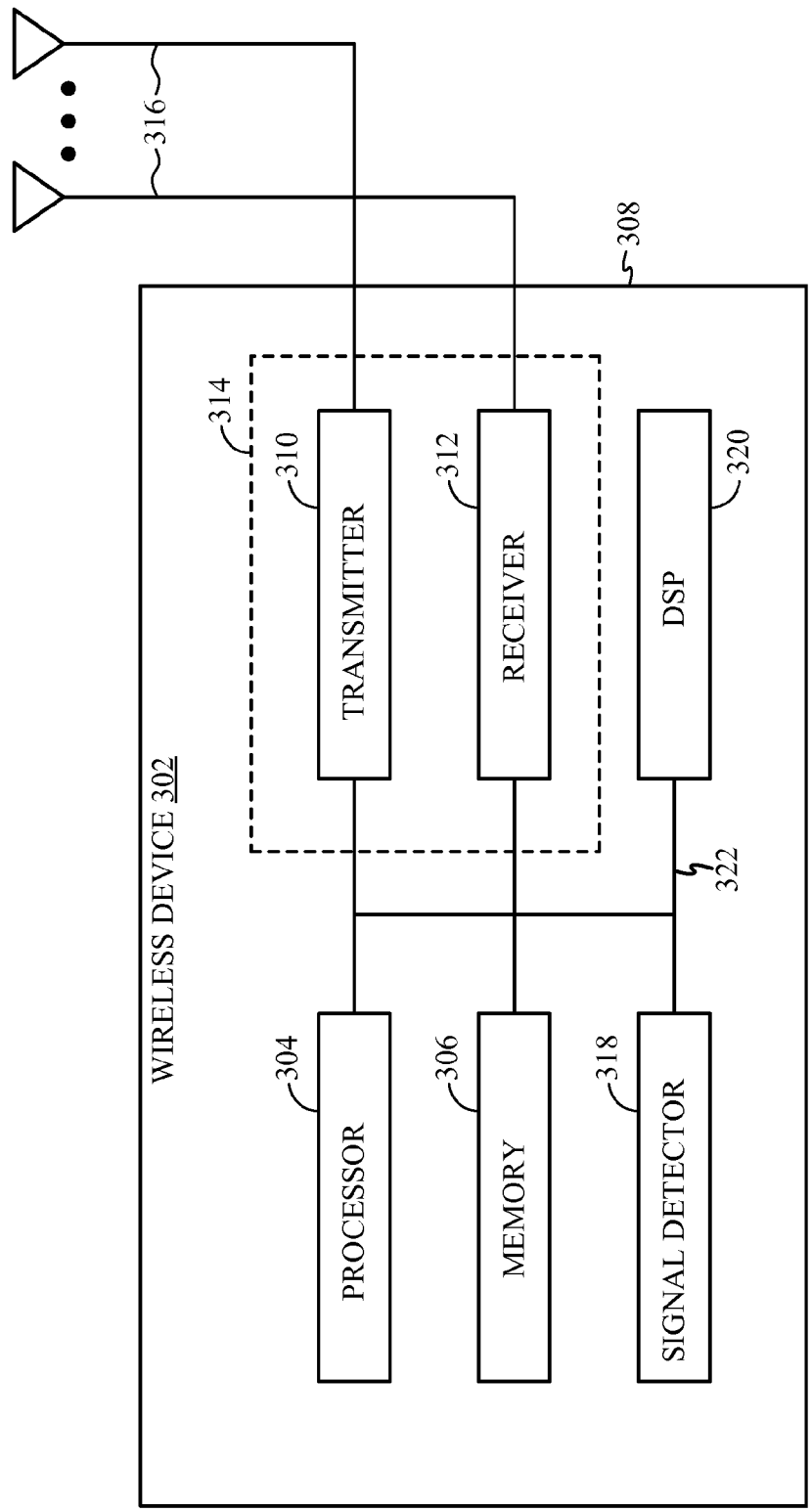
FIG. 3 illustrates a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein, such as operations 800 in FIG. 8, which may be performed to generate an IE and provide an indication of whether or not the IE is for stations that support segmentation (slicing) or operations 900 in FIG. 9 to receive an IE and determine whether the IE is for stations that support segmentation (slicing). The wireless device 302 may be an AP 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. One or more transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example TIM Information Element Indicator

Generally, a traffic indication map (TIM) IE may be used to indicate which stations have buffered MSDUs within an AP. TIM segmentation may be used to support a subset of stations per segment. However, legacy stations may not support TIM segmentation. TIM segmentation may also be referred to as page slicing, as multiple IEs may be used to convey information for different sets of stations within the same page.

Figure 4:
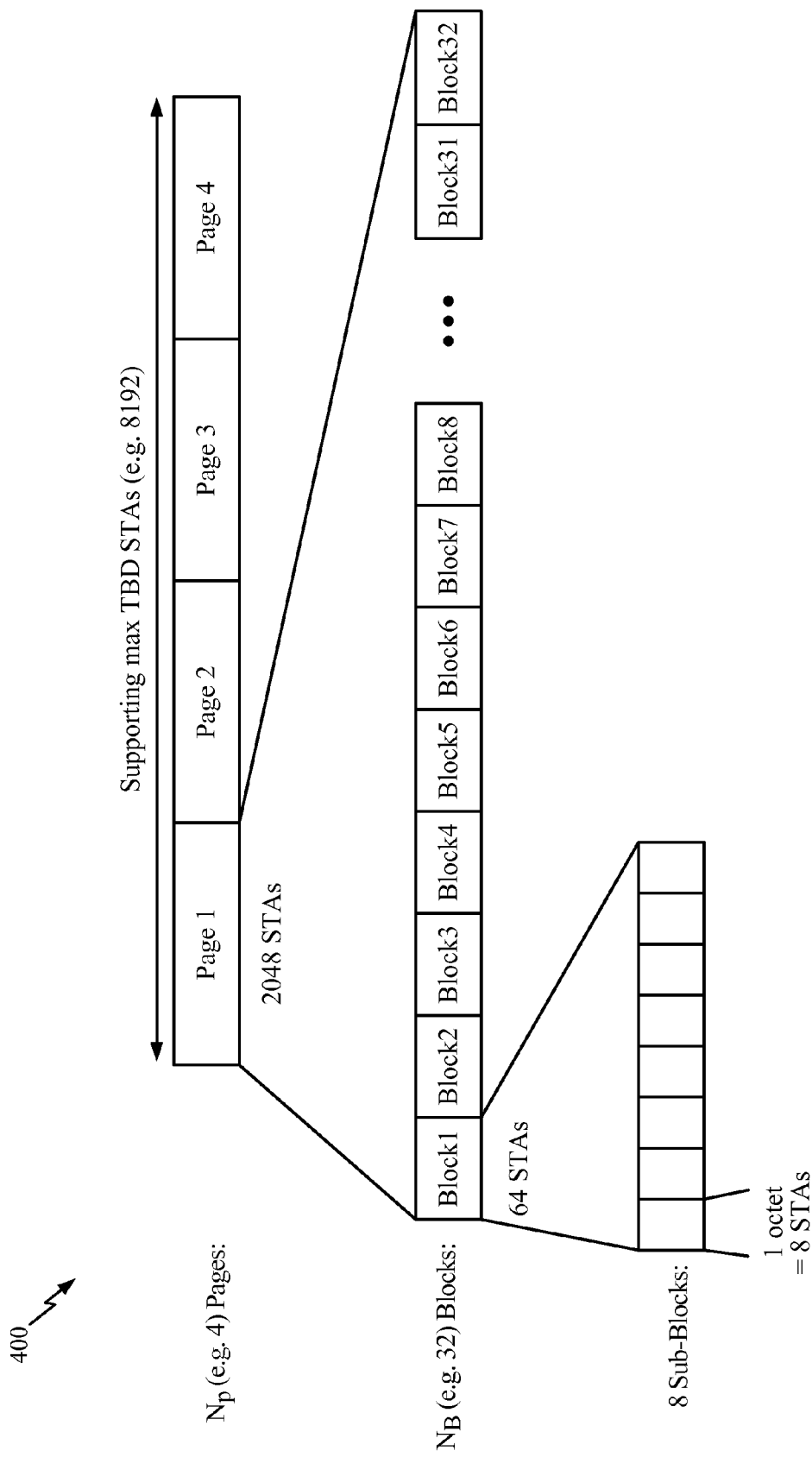
FIG. 4 illustrates an example of page segmentation within a DTIM beacon interval, in accordance with certain aspects of the present disclosure.

FIG. 4 illustrates an example of page segmentation (slicing) in a TIM segment 400. Within a total AID space, a page may represent a subset of stations. Each page may comprise a number of blocks, each of which may represent a subset of the stations within a page, and each block may comprise a number of page slices, each of which may represent a subset of the stations within a block. Segmentation or slicing may be performed in a TIM segment (i.e., page slice) within one delivery TIM (DTIM) beacon interval. The length of a segment may vary over multiple DTIM segment intervals. Each ordered page segment may be assigned sequentially to one or more TIM segments.

Figure 5:
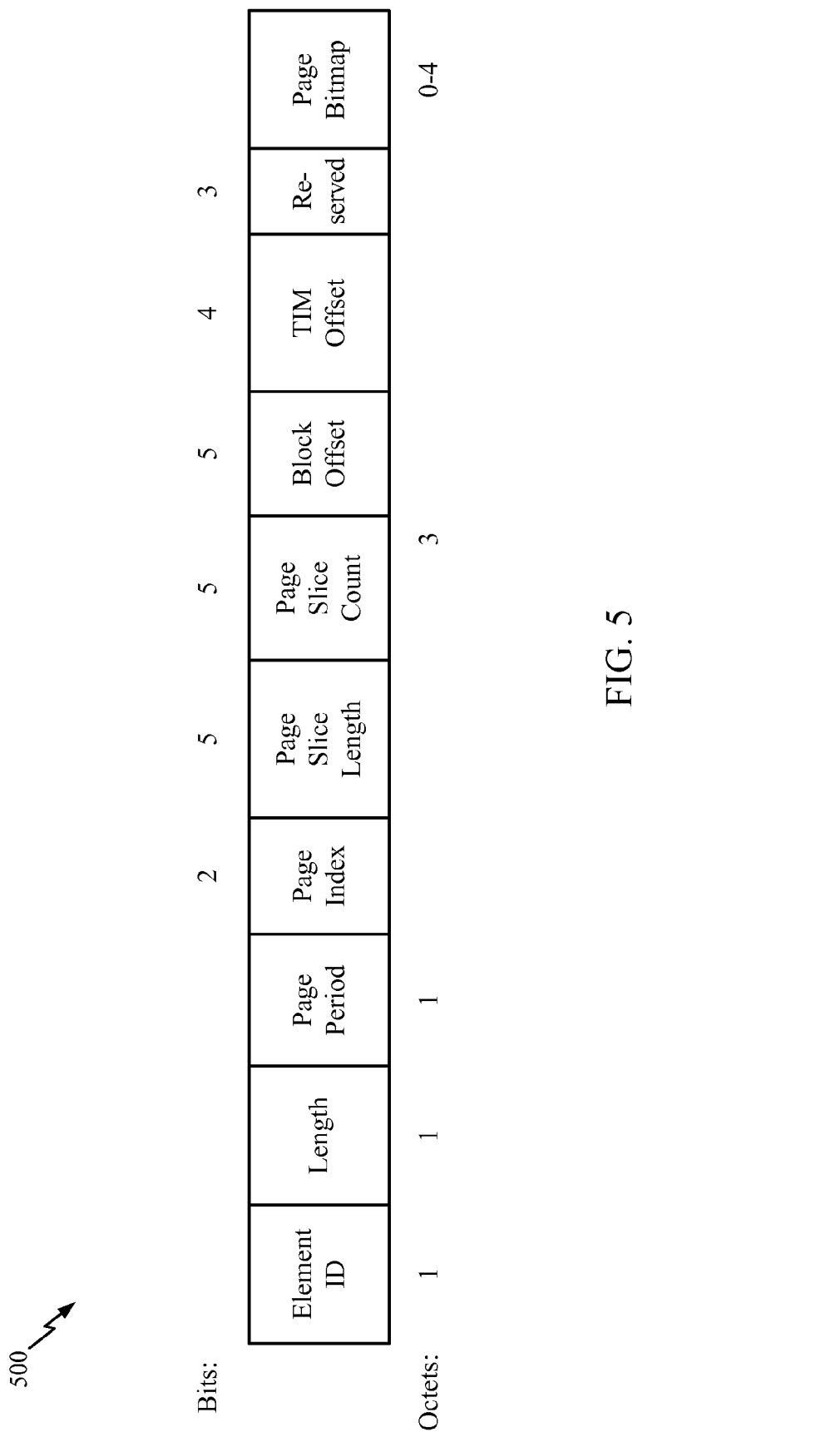
FIG. 5 illustrates an example frame format for a segment count information element in accordance with certain aspects of the present disclosure.

FIG. 5 illustrates an example frame format 500 for a segment count (page slice) IE. A segment count IE may be used to indicate the assignment of page segments in following TIM segments. The segment count IE may comprise an element ID, a length, a page period, a page index, a page slice length, a page/segment slice count, a block offset, a TIM offset, a reserved field, and a page bitmap field. The element ID field may identify the segment (page slice) count IE. The length field may indicate the length of the IE. The page period field may provide an indication of the number of beacon intervals between beacons that can carry the page slice element for the associated page. The page index field may provide an indication of the page currently assigned in a beacon. The page slice length field may indicate the number of blocks included in each TIM for an associated page. The page slice count field may indicate a number of TIM slices scheduled in a page period. The block offset field may indicate the first block in an assigned page segment. The TIM offset field may indicate a TIM beacon offset for a first page slice of a specific page that carries the page slice element of the assigned page. The page bitmap field may comprise blocks of all page segments in a DTIM element.

Figure 6:
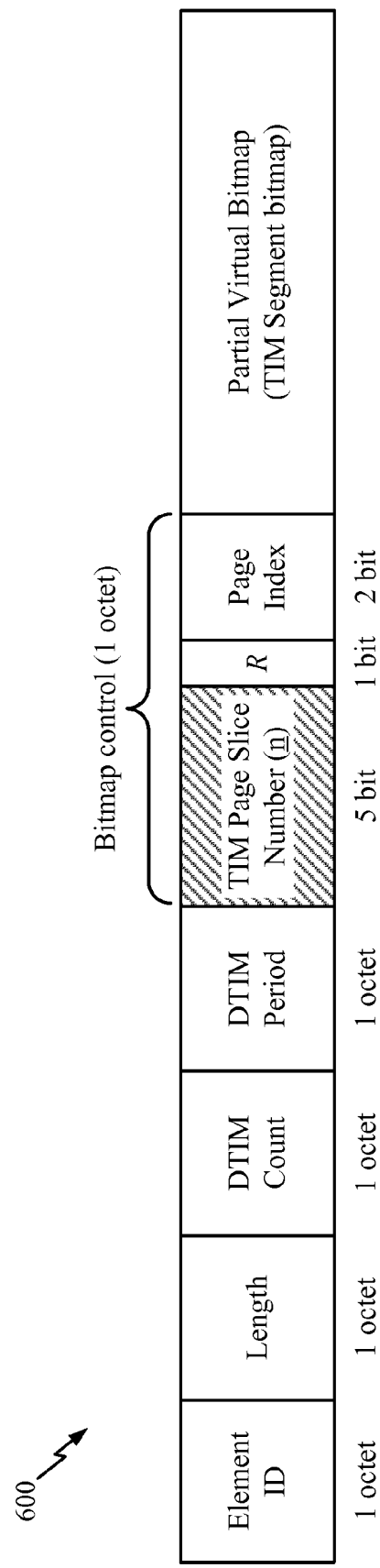
FIG. 6 illustrates an example traffic indication map (TIM) information element (IE) with a TIM Segment Number (such segmentation is sometimes referred to as page slicing and a Segment Number may also be referred to as a Page Slice number) field in accordance with certain aspects of the present disclosure.

FIG. 6 illustrates an example TIM IE 600 including a TIM segment number (page slice number) field within the IE. The TIM IE may comprise an element ID, a length, a DTIM count, a DTIM period, a bitmap control, and a partial virtual bitmap (or TIM segment bitmap). The bitmap control may comprise a TIM segment number indicating the index of the TIM segment, a reserved bit, and a page index. The TIM bitmap information covered in the TIM IE may be calculated as a TIM segment start and TIM segment end value. The TIM segment start value may be calculated as:

TIM segment start=page offset+((length of page segment)*(TIM segment number−1))+1 while the TIM segment end value may be calculated as:

TIM segment start=page offset+length of page segment*TIM segment number

Figure 7:
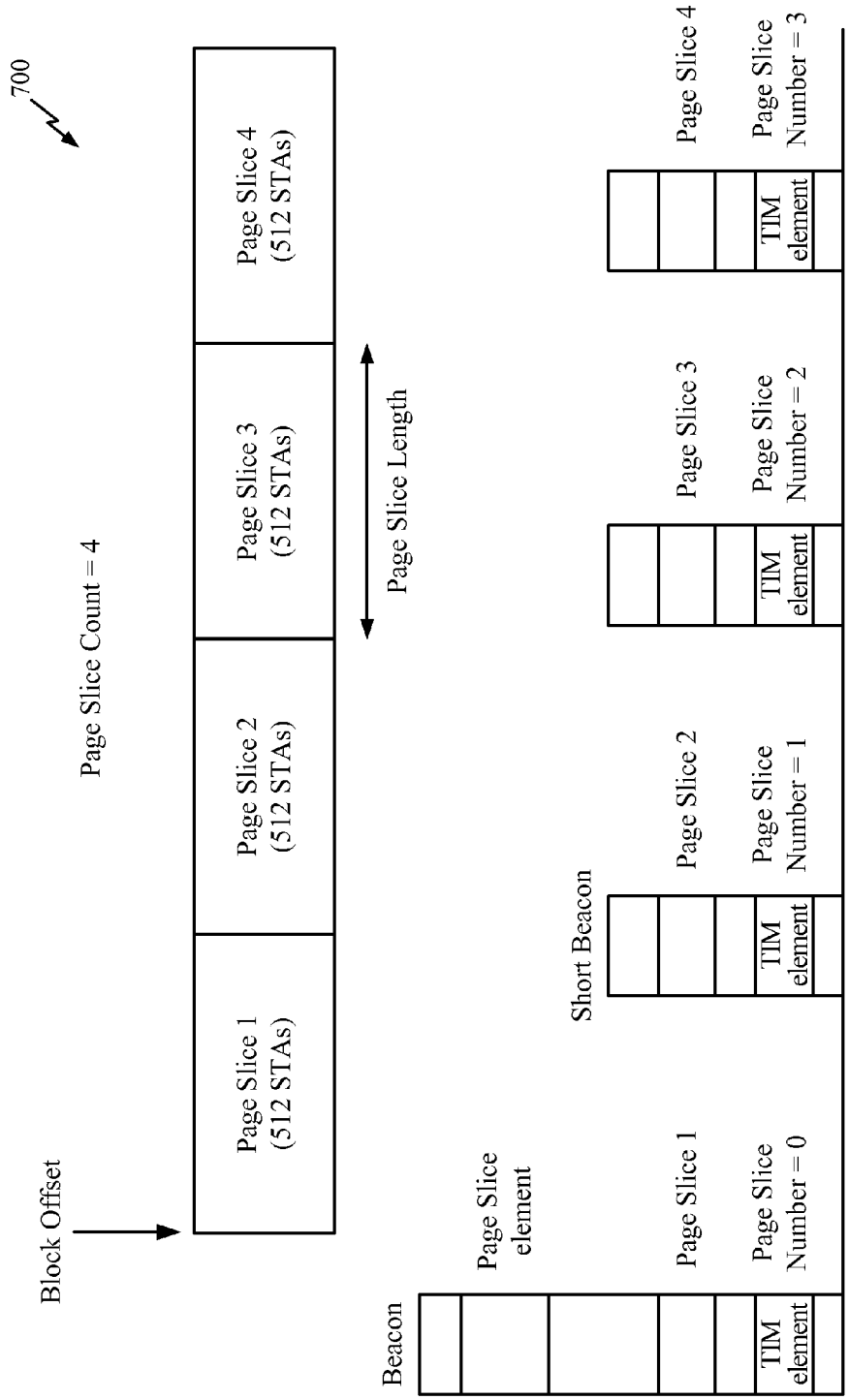
FIG. 7 illustrates an example TIM segmentation (page slicing) in accordance with certain aspects of the present disclosure.

FIG. 7 illustrates an example of TIM segmentation (page slicing) 700. A beacon may contain a first page segment and a segment count IE for stations in all page segments. A succession of short beacons may transmit additional page segments. Page segments may be transmitted sequentially, such that the beacon transmits the first page segment, the first short beacon transmits the second page segment, and so on.

The TIM element may contain a TIM segmentation (page slice) number, which, without any context, may be meaningless for stations that do not support TIM segmentation. Further, stations that do not support TIM segmentation may not know which TIM the station should read and parse.

According to certain aspects of the present disclosure, a TIM may contain one or more values that may indicate whether a TIM is intended for stations that support TIM segmentation or stations that do not support TIM segmentation. For example, the indication may be a reserved value of the TIM segmentation number, a new field, a flag bit, or a TIM element with a new element ID.

FIG. 8 illustrates example operations 800 that may be performed by an AP in accordance with certain aspects of the present disclosure. Operations 800 may begin at 802, where the AP generates an information element (IE). At 804, the AP provides an indication of whether or not the IE is for stations that support segmentation.

Figure 9:
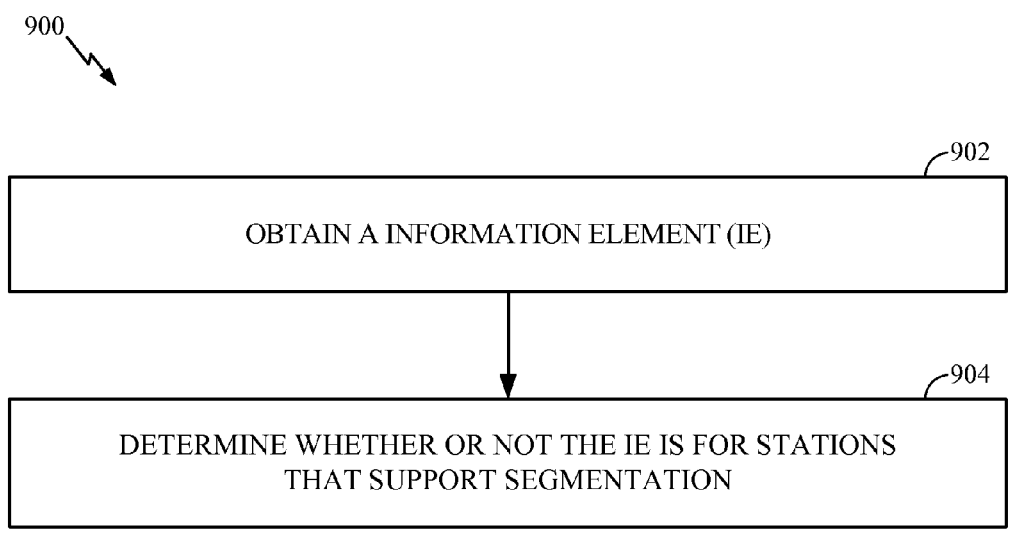
FIG. 9 illustrates example operations that may be performed by a wireless device in accordance with certain aspects of the present disclosure.

FIG. 9 illustrates example operations 900 that may be performed by a receiver in accordance with certain aspects of the present disclosure. Operations 900 may begin at 902, where the receiver obtains an IE. At 904, the receiver determines whether or not the IE is for stations that support segmentation.

The IE may be a TIM IE. The indication of whether or not the TIM IE is for stations that support segmentation may be provided via one or more predetermined bit sequences of a TIM segment number in the TIM IE. The one or more predetermined bit sequences may comprise at least one of all '0's or all '1's.

The indication of whether or not the IE is for stations that support segmentation may entail setting a field in the IE to one or more predetermined bit sequences. The field may be set to a value other than the one or more predetermined bit sequences to indicate the IE is for stations that do not support segmentation.

For example, if a 5-bit sequence is used to identify a page slice, providing for page slice ID values of 0 through 31. In some cases, a reserved value, such as 31 (11111), may be used to indicate that the IE is for stations that do not support segmentation, while remaining values 0-30 may be used to indicate that the IE is for stations that support segmentation.

In some aspects, an AP may transmit an IE including TIM information for stations that support TIM segmentation (page slicing) using a sequence indicating that the TIM IE is for stations that do not support page slicing. In some aspects, an IE using a sequence indicating that the TIM IE is for stations that do not support page slicing may also contain information for a subset of stations to do support page slicing. Devices that do not support TIM segmentation (page slicing) may be configured to examine the one or more TIM pages containing the reserved page slice number (e.g., 31 in the 5-bit example above) used for stations that do not support segmentation (page slicing). In some cases, devices that support TIM segmentation (page slicing) may be configured to examine both IEs containing a page slice number to which the station is assigned as well as IEs containing a page slice number used for stations that do not support segmentation. Having such devices examine IEs with both the reserved and non-reserved page slice numbers may allow APs that do not support page slicing to communicate with devices that do support page slicing.

The indication of whether or not the IE is for stations that support segmentation may be provided via a format type of the IE. A first format type may indicate that the IE is for stations that do not support segmentation, while a second format type may indicate that the IE supports segmentation.

The indication of whether or not the IE is for stations that support segmentation may be provided via one or more flag bits in the IE.

The indication of whether or not the IE is for stations that support segmentation may be provided via an order in which the IE occurs in a transmitted beacon. For example, an indication may comprise placing an IE for stations that do not support segmentation before other IEs in a beacon.

Figure 8A:
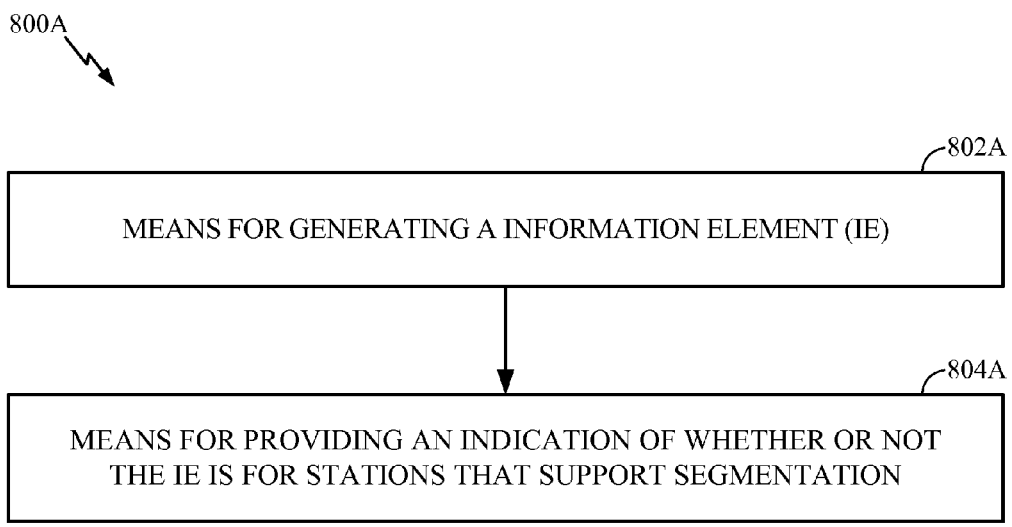
FIG. 8A illustrates example means capable of performing the operations shown in FIG. 8.
Figure 9A:
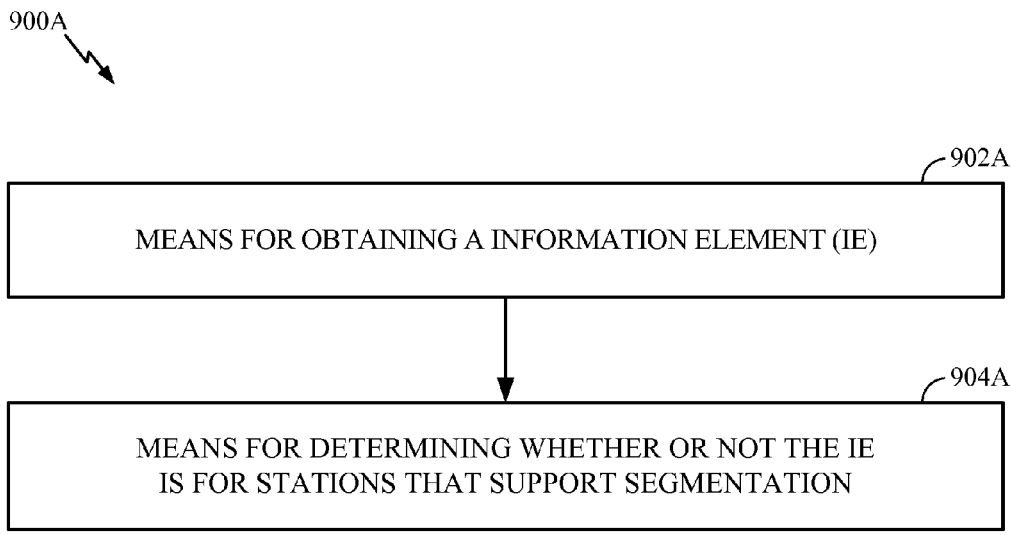
FIG. 9A illustrates example means capable of performing the operations shown in FIG. 9.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 800 and 900 illustrated in FIGS. 8 and 9 correspond to means 800A and 900A illustrated in FIGS. 8A and 9A, respectively.

For example, means for transmitting may comprise a transmitter (e.g., the transmitter unit 222) and/or an antenna(s) 224 of the AP 110 illustrated in FIG. 2 or the transmitter 310 and/or antenna(s) 316 depicted in FIG. 3. Means for receiving may comprise a receiver (e.g., the receiver unit 222) and/or an antenna(s) 224 of the AP 110 illustrated in FIG. 2 or the receiver 312 and/or antenna(s) 316 depicted in FIG. 3. Means for processing, means for determining, means for detecting, means for scanning, means for selecting, or means for terminating operation may comprise a processing system, which may include one or more processors, such as the RX data processor 242, the TX data processor 210, and/or the controller 230 of the AP 110 illustrated in FIG. 2 or the processor 304 and/or the DSP 320 portrayed in FIG. 3.

According to certain aspects, such means may be implemented by processing systems configured to perform the corresponding functions by implementing various algorithms (e.g., in hardware or by executing software instructions) described above for performing fast association. For example, means for identifying wakeup periods may be implemented by a processing system performing an algorithm that identifies wakeup periods based on a configuration (e.g., via an IE), means for determining whether to enable radio functions during wakeup periods may be implemented by a (same or different) processing system performing an algorithm that takes, as input, the wakeup periods and whether the presence of data has been indicated, while means for enabling radio functions may be implemented a (same or different) processing system performing an algorithm that takes, as input, the decision from means for determining and generates signals to enable/disable the radio functions accordingly.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. Thus, in some aspects, computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
a processing system configured to:
    generate an information element (IE);
    provide an indication of whether or not the IE is for devices that support segmentation, wherein the indication is provided via one or more bit sequences of a field in the IE, and wherein the bit sequence of the field is set to one of the one or more bit sequences to indicate the IE is for devices that do not support segmentation or to a value other than the one or more bit sequences to indicate the IE is for devices that do support segmentation; and
a transmitter configured to transmit the IE.

2. The apparatus of claim 1, wherein the IE is a traffic indication map (TIM) IE.

3. The apparatus of claim 1, wherein the processing system is configured to:
set a bit sequence of the field to one of the one or more bit sequences to indicate the IE is for devices that do not support segmentation and that the IE contains information for a subset of the devices that do support segmentation.

4. The apparatus of claim 1, further comprising:
an antenna coupled to the transmitter, wherein the transmitter is configured to transmit the IE via the antenna, and wherein the apparatus is configured as an access point.

5. An apparatus for wireless communications, comprising:
a processing system configured to:
generate an information element (IE); and
provide an indication of whether or not the IE is for devices that support segmentation, wherein the IE is a traffic indication map (TIM) IE, wherein the indication is provided via one or more bit sequences of a Page Slice Number field of the TIM IE, and wherein the one or more bit sequences comprise at least one of: all '0's or all '1's; and
a transmitter configured to transmit the IE.

6. The apparatus of claim 5, further comprising:
an antenna coupled to the transmitter, wherein the transmitter is configured to transmit the IE via the antenna, and wherein the apparatus is configured as an access point.

7. An apparatus for wireless communications, comprising:
a processing system configured to:
generate an information element (IE); and
provide an indication of whether or not the IE is for devices that support segmentation, wherein the indication is provided via a format type of the IE, and wherein a first format type indicates the IE is for devices that do not support segmentation and a second format type indicates the IE is for devices that do support segmentation; and
a transmitter configured to transmit the IE.

8. An apparatus for wireless communications, comprising:
a processing system configured to:
generate an information element (IE); and
provide an indication of whether or not the IE is for devices that support segmentation, wherein the indication is provided via an order in which the IE occurs in a beacon to be transmitted, and wherein placement of the indicate the IE before other IEs in the beacon indicates that the IE is for devices that do not support segmentation; and
a transmitter configured to transmit the beacon.

9. An apparatus for wireless communications, comprising:
a receiver configured to obtain an information element (IE); and
a processing system configured to:
determine whether or not the IE is for devices that support segmentation, wherein the determination is based on whether or not a field in the IE is set to one or more reserved bit sequences, wherein the IE is for devices that do not support segmentation if a bit sequence of the field is set to one of the reserved sequences and the IE is for devices that do support segmentation if the bit sequence of the field is set to a value other than the one or more reserved sequences.

10. The apparatus of claim 9 wherein the one or more reserved bit sequences are known by the apparatus.

11. The apparatus of claim 9, wherein the processing system is configured to:
determine the IE is for devices that do not support segmentation and contains information for a subset of the devices that do support segmentation if a bit sequence of the field is set to one of the one or more reserved bit sequences.

12. The apparatus of claim 9, wherein the processing system is configured to process the IE even if it is determined that the IE is for devices that do not support segmentation.

13. The apparatus of claim 9, further comprising:
an antenna coupled to the receiver, wherein the receiver is configured to receive the IE via the antenna, and wherein the apparatus is configured as a user terminal.

14. An apparatus for wireless communications, comprising:
a receiver configured to obtain an information element (IE), wherein the IE is a traffic indication map (TIM) IE; and
a processing system configured to:
determine whether or not the IE is for devices that support segmentation, wherein the determination is based on one or more bit sequences of a Page Slice Number field of the TIM IE, wherein the one or more bit sequences comprise at least one of all '0's or all '1's and wherein the determination comprises determining that the IE is not for devices that support segmentation.

15. The apparatus of claim 14, wherein the processing system is configured to process the IE even if it is determined that the IE is for devices that do not support segmentation.

16. The apparatus of claim 14, further comprising:
an antenna coupled to the receiver, wherein the receiver is configured to receive the IE via the antenna, and wherein the apparatus is configured as a user terminal.

17. An apparatus for wireless communications, comprising:
a receiver configured to receive an information element (IE); and
a processing system configured to:
determine whether or not the IE is for devices that support segmentation, wherein the determination is based on a format type of the IE, and wherein a first format type indicates the IE is for devices that do not support segmentation and a second format type indicates the IE is for devices that do support segmentation.

18. An apparatus for wireless communications, comprising:
a receiver configured to receive a beacon including an information element (IE); and
a processing system configured to:
determine whether or not the IE is for devices that support segmentation, wherein the determination is based on an order in which the IE occurs in the beacon, and wherein the processing system determines the IE is for devices that do not support segmentation if the IE occurs before other IEs in the beacon.

* * * * *